United States Patent [19]

Luke

[11] E Patent Number: Re. 32,615

[45] Reissued Date of Patent: Mar. 1, 1988

[54] CIGARETTES

[75] Inventor: John A. Luke, Eastleigh, England

[73] Assignee: Brown & Williamson Tobacco Corporation, Louisville, Ky.

[21] Appl. No.: 32,401

[22] Filed: Mar. 30, 1987

Related U.S. Patent Documents

Reissue of:

[64] Patent No.: 4,637,410
Issued: Jan. 20, 1987
Appl. No.: 757,406
Filed: Jul. 22, 1985

[30] Foreign Application Priority Data

May 24, 1985 [GB] United Kingdom ..... 8513233

[51] Int. Cl.[4] ..... A24D 1/00
[52] U.S. Cl. ..... 131/361; 131/360
[58] Field of Search ..... 131/361, 360, 84.1, 131/84.2, 84.3, 84.4, 906

[56] References Cited

U.S. PATENT DOCUMENTS 4,553,556 11/1985 Lephardt ..... 131/361

OTHER PUBLICATIONS

Ecosometrics Inc. report No. RR-211, "Cost Analysis of Options for Self-Extinguishing Cigarettes", A.M. Lago and J.A. Shannon, Jan. 14, 1987, prepared for Center for Fire Research and Applied Economics Group, Mathematical Analysis Div., Nat'l Bureau of Standards, pp. 1-34.

*Beitrage zur Tabakforschung Int'l.*, vol. 12, Nov., 1984, pp. 259-269.

*Recent Advances in Tobacco Sciences*, vol. 4, "Physical Parameters Which Affect the Composition of Cigarette Smoke", 32nd Tobacco Chemists' Research Conf., Oct. 30-Nov. 1, 1978, pp. 85-111.

1966 Kenya Tobacco Co. brand project papers containing specifications for the "Ten Cent" brand cigarette and other marketing details (6 sheets).

Sept., 1968 Kenya Tobacco Co. specification sheet for Velin .012 cigarette paper (1 sheet).

Apr. 29, 1968 Kenya Tobbaco Co. specification sheet (1 sheet).

1969 Kenya Tobacco Co. laboratory reports analyzing specifications of sample Ten Cent production cigarettes (3 sheets).

1 Bangladesh "BIDI" cigarette.

German Gebrauchsmuster Utility Model Patent No. 1,926,149, registered Oct. 28, 1965 (together with English translation).

Excerpts of Minutes of Technical Study Group Meeting, Feb. 12-13, 1987 (Cover pg., pp. 9-11, 14 and attachment A comprising two unnumbered pages).

*Primary Examiner*—Vincent Millin
*Attorney, Agent, or Firm*—Charles G. Lamb

[57] ABSTRACT

A cigarette comprises a tobacco rod of tobacco filler wrapped in a paper wrapper, the circumference of the rod being within a range of 10 mm to 19 mm and the free burn rate of the rod being within a range of 25 to 45 mg $min^{-1}$. The cigarette may comprise considerably less tobacco than a cigarette of orthodox circumference yet yield an equal or greater number of puffs.

15 Claims, 1 Drawing Figure

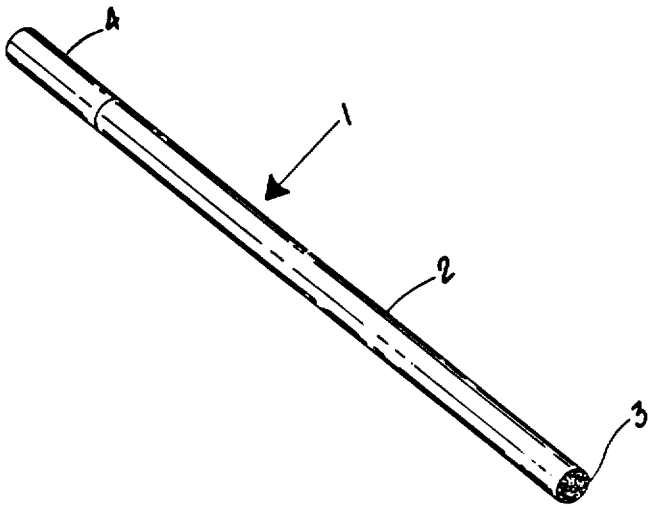
4
1
2
3

CIGARETTES

Matter enclosed in heavy brackets [ ] appears in the original patent but forms no part of this reissue specification; matter printed in italics indicates the additions made by reissue.

This invention relates to cigarettes.

It is a requisite of cigarettes of commercially acceptable quality that when lit but not being smoked, the coal continues to burn, at a slow rate, a condition usually referred to as smouldering. A number of cigarette design parameters affect the smoulder rate, otherwise known as the free or static burn rate. One of these is the air permeability of the cigarette paper; the lower the air permeability, the lower is the smoulder rate. Another factor relating to smoulder rate is the amount of tobacco which is consumed in unit time. It has previously been thought that for an acceptable linear smoulder rate, a minimum amount of about 60 mg of tobacco had to be consumed per minute in order to assure the maintenance in the coal of enough heat to sustain the coal in its smouldering condition. This factor has heretofore been seen to make it necessary for a cigarette rod of the usual circular cross section to have a circumference of at least about 22 mm if the cigarette was to smoulder in a reliable manner.

The present invention provides a cigarette comprising a tobacco rod which rod comprises a tobacco filler and a paper wrapper, the circumference of said rod being within a range of 10 mm to 19 mm, preferably 12.5 mm to 19 mm, and the free burn rate of said rod being within a range of 25 to 45 mg $min^{-1}$, and preferably being within a range of 30 to 45 mg $min^{-1}$.

The present invention is based on our finding that in point of fact cigarettes having circumferences of 19 mm or less and free burn rates of 45 mg $min^{-1}$ or less smoulder in a fully acceptable manner and that in addition such cigarettes exhibit a number of significant practical advantages.

There is no necessity in order to provide cigarettes according to the present invention which smoulder reliably between puffs to make compensatory adjustments to the cigarette paper air permeability value or to provide the cigarette paper with unorthodox levels of burn rate promoting additives, or in fact to make compensatory adjustments in regard to any other parameters which affect smoulder rate.

The packing density of the rod may be within a range of 150 mg $cm^3$ to 350 mg $cm^3$, and preferably within a range of 200 mg $cm^3$ to 300 mg $cm^3$.

Cigarettes according to the present invention, as well as being of elegant appearance, utilise tobacco with increased efficiency. Thus a cigarette may be provided according to the present invention which, compared with a cigarette of orthodox dimensions, having, for example, a circumference of 25 mm, comprises considerably less tobacco, 25% less for example, and yet which provides an equal, or even greater number of puffs. The actual number of puffs, will, of course, be dependent inter alia upon the length of the cigarette.

For unit length of tobacco rod, the reduction in the cigarette paper requirement is, leaving the longitudinal lap seam out of account, directly proportional to rod diameter reduction, whereas the reduction in tobacco requirements is, assuming constant packing density, in proportion to the ratio of the squares of the diameters.

Thus in unit length of a cigarette according to the present invention the ratio of mass of cigarette paper to mass of tobacco is higher than that for a cigarette of conventional circumference at equal packing densities. Thus in cigarettes according to the present invention, exceptionally firm ash formations are obtainable.

In that cigarettes may be provided according to the present invention which contains less tobacco than orthodox cigarettes at equal puff numbers, cigarettes according to the present invention exhibit lower smoke component mainstream and sidestream deliveries.

It has been observed in comparing cigarettes according to the present invention with orthodox cigarettes of the same tobacco filler density and with the filler cut at the same number of cuts per inch, that the cigarettes according to the present invention are of firmer feel than the orthodox cigarettes. In other words, the same filler in the inventive cigarettes apparently has a higher filling power than when it is incorporated in orthodox cigarettes. It is surmised that this phenomenon may derive from the increase in the ratio of the mean particle size of the filler to the cross-sectional area of the tobacco rod. It does means though that for equal filling power values, a reduction in tobacco weight may be made over and above that resulting directly from the reduction in tobacco rod cross-sectional area.

The tobacco filler may comprise expanded tobacco, reconstituted tobacco or substitute smoking materials. The tobacco rods of cigarettes according to the present invention may be of a cross-section other than round. They may, for example, be of elliptical or rectilinear cross-section.

If cigarettes according to the present invention are fitted with filters and the filters are of the same transverse dimensions as the tobacco rods, there will be a saving in filter material requirements compared with those of orthodox filter tipped cigarettes. It may be observed in relation to the conventional form of filter comprising cellulose acetate, that a reduction in cellulose acetate tow utilisation can be effected without there necessarily being a change in pressure drop in going from orthodox filter circumferences to circumferences appropriate for filters for attachment to cigarettes according to the present invention.

For constant pressure drops and for unit length of filter the tow requirement is, in fact, reduced by an amount in excess of that suggested by the ratio of the areas of conventional and inventive cigarette.

By use of the present invention significant reductions in packaging material requirements per unit cigarette may be realised.

A cigarette in accordance with the present invention is shown in the accompanying diagrammatic drawing and is generally designated by reference numeral 1.

The cigarette 1 comprises cigarette paper 2 wrapped about a cut tobacco filler, to provide a tobacco rod, an end portion of which filler is referenced 3. Cigarette 1 further comprises a tipping wrapper 4 which serves to maintain a filter, of cellulose acetate tow for example, in abutment with the end of the tobacco filler remote end 3 thereof. The overall length of cigarette 1 is 120 mm and the diameter is 5 mm.

Cigarettes in accordance with the invention were made having tobacco rod lengths of 100 mm to which were attached 20 mm long filters. These cigarettes were made in two circumferences, 15 mm and 17 mm, the cigarettes being designated A and B respectively. Under standard smoking conditions, measurements were made of the total deliveries of mainstream smoke particulate matter, on a water and nicotine free basis, and of total nicotine alkaloids. By way of comparison, similar measurements were made for an orthodox commercially marketed cigarette of 25 mm circumference and having tobacco rod and filter lengths of 64 mm and 20 mm respectively. The results are as shown in the table below.

| | A | B | ORTHODOX |
|---|---|---|---|
| PMWNF (mg) | 9.6 | 16.0 | 14.5 |
| TNA (mg) | 0.81 | 1.34 | 1.26 |
| PUFF NUMBER | 8.2 | 13.8 | 9.3 |
| TOBACCO WEIGHT (mg) | 325 | 650 | 834 |

The table clearly indicates the effectiveness of the present invention in utilising tobacco at an increased level of efficiency.

What is claimed is:

1. A *finished* cigarette [comprising a tobacco] *of commercially acceptable quality and elegant appearance in the form of an elongated rod of uniform cross-section throughout its length capable of sustained smoulder when lit but not being smoked, said elongated* rod [which rod comprises] *consisting of* a *cut* tobacco filler [and], a *cigarette* paper wrapper, *circumscribing said cut tobacco filler, a filter in abutment with one end of said cut tobacco filler and a tipping wrapper maintaining said filter in abutment with said one end of said cut tobacco filler,* the circumference of said *elongated* rod being within a range of 10 mm to 19 mm, and having a *cut* tobacco filler packing density within the range of 150 mg per $cm^3$ to 350 mg per $cm^3$ yielding a free burn rate of said rod within a range of 25 to 45 mg $min^{-1}$, *the aforesaid cigarette utilizing tobacco at greater efficiency than conventional commercially marketed cigarettes.*

2. A cigarette as claimed in claim 1, wherein said circumference is within a range of 12.5 mm to 19 mm.

[3. A cigarette as claimed in claim 1, wherein the packing density of said tobacco filler is within a range of 150 mg per $cm^3$ to 350 mg $cm^3$.]

4. A cigarette as claimed in claim [3] *1*, wherein the packing density of said *cut* tobacco filler is within a range of 200 mg per $cm^3$ to 300 mg per $cm^3$.

5. A cigarette as claimed in claim 1 [and further comprising a], *wherein said* filter *is* of the same transverse dimensions as *the cut tobacco filler portion of* said *elongated* rod.

*6. A cigarette as claimed in claim 1, wherein said cigarette paper wrapper is co-terminus with said cut tobacco filler at the end thereof opposite said filter to thereby fully expose said cut tobacco filler at the end of said elongated rod opposite said filter.*

*7. A cigarette as claimed in claim 1, wherein said cigarette paper wrapper contains a conventional cigarette paper air permeability value and a conventional level of burn rate promoting additives.*

*8. A cigarette as claimed in claim 1, wherein the cut tobacco filler portion of said elongated rod has a firmer feel than conventional commercially marketed cigarettes.*

*9. A cigarette as claimed in claim 1, which obtains a firm ash formation when smoked.*

*10. A cigarette as claimed in claim 1, which contains on the order of 25% less tobacco, and yet provides an equal or greater number of puffs, than conventional commercially marketed cigarettes.*

*11. A cigarette as claimed in claim 1, which provides in excess of about 8 puffs.*

*12. A cigarette as claimed in claim 1, wherein said elongated rod is of circular cross-section having a circumference within a range of 15 to 17 mm, and said cut tobacco filler has a length of approximately 100 mm.*

*13. A cigarette as claimed in claim 11, which provides between about 8 and 13 puffs.*

*14. A cigarette as claimed in claim 12, wherein said filter is approximately 20 mm in length.*

*15. A cigarette as claimed in claim 12, wherein said elongated rod has a circumference of approximately 15.7 mm.*

*16. A cigarette as claimed in claim 12, wherein said cut tobacco filler is utilized at an efficiency on the order of two times greater than tobacco utilization in conventional commercially marketed cigarettes.*

* * * * *